United States Patent [19]
Johns

[11] Patent Number: 4,470,335
[45] Date of Patent: Sep. 11, 1984

[54] METHOD AND APPARATUS FOR REMOTE ATTACHMENT

[75] Inventor: Earl Johns, Fort Worth, Tex.

[73] Assignee: Gearhart Industries, Inc., Fort Worth, Tex.

[21] Appl. No.: 387,863

[22] Filed: Jun. 14, 1982

[51] Int. Cl.³ .............................. F41F 1/00
[52] U.S. Cl. ..................... 89/1 R; 102/501; 102/507; 403/276; 403/284
[58] Field of Search ............... 89/1 G, 1 B; 102/504, 102/507, 509, 501; 411/23, 501, 361, 440, 441; 403/284, 276, 282, 285, 283, 278, 281; 277/9–11

[56] References Cited

U.S. PATENT DOCUMENTS

| | | | |
|---|---|---|---|
| 549,334 | 11/1895 | Smith | 102/509 |
| 1,473,137 | 11/1923 | Zierten | 411/504 |
| 1,681,295 | 8/1928 | Johnson | 102/509 |
| 2,283,095 | 5/1942 | Sabol | 403/282 X |
| 2,579,227 | 12/1951 | Edwards | 403/282 |
| 2,661,694 | 12/1953 | Allen et al. | 102/508 |
| 2,789,465 | 4/1957 | McDonald | 89/1 G |
| 2,993,461 | 7/1961 | Feiler | 102/504 X |
| 3,442,537 | 5/1969 | Courtot et al. | 285/174 |
| 3,480,306 | 11/1969 | Hsu | 403/281 |
| 3,762,266 | 10/1973 | Thellmann | 411/501 |
| 3,941,059 | 3/1976 | Cobb | 102/510 |
| 4,044,685 | 8/1977 | Avcin | 102/508 |
| 4,125,298 | 11/1978 | Heurich et al. | 403/285 X |
| 4,275,680 | 6/1981 | Pennington et al. | 89/1 G X |

*Primary Examiner*—David H. Brown
*Attorney, Agent, or Firm*—Head, Johnson & Stevenson

[57] ABSTRACT

A method and apparatus for remotely attaching one object to another object comprising: (a) a target consisting of layers of contrasting hardness attached to one object, wherein the outer layer is a relatively soft composition and the underlying base is a relatively hard composition, and (b) a projectile of intermediate hardness attached to the other object. By propelling the projectile against the target, the projectile penetrates the softer outer layer and expands upon impact with the inner layer, thus securely anchoring the two objects together. Such a method and apparatus are useful in outer space and underwater applications.

14 Claims, 9 Drawing Figures

METHOD AND APPARATUS FOR REMOTE ATTACHMENT

BACKGROUND OF THE INVENTION

1. Field of the Invention

This invention relates to a method and apparatus for remotely attaching one object to another object. More specifically, the invention relates to attaching a projectile of intermediate hardness to a target of layers of contrasting hardness, a softer outer layer and a harder inner layer.

2. Description of the Prior Art

The basic concept of attaching one object to another object is in itself a very broad and complex subject encompassing a vast number of methods and apparatus. The remote attachment of an object to a physically removed second object is a more limited subject, yet various techniques to accomplish this task have historically been employed in a variety of situations. When considering the remote attachment of a tethered projectile to a desired remote target, the number of known alternatives is significantly reduced with few representing reliable methods or apparatus for rigidly and securely interconnecting the projectile to the target and to the best of our knowledge none are known to involve three compositions of contrasting hardness.

With the advent of increased under water commercial activities, including oil and gas exploration, subsea mining and the like and with future prospects of outer space commercial activity, the need for a reliable method of securely attaching a projectile fired at a target exists.

SUMMARY OF THE INVENTION

In view of the need for a reliable method of remotely attaching and securely fastening one object to another particularly in hostile environments such as outer space or underwater, I have discovered an improved method and apparatus involving three different materials of contrasting hardness. Thus, the present invention provides in a method for attaching one object to another object, the specific improvement comprising: firing a projectile of intermediate hardness from a remote location into a target comprising layers of contrasting hardness wherein the projectile penetrates the outer softer layer of the target and expands upon impact with the harder inner layer of the target, thus anchoring the projectile to the target.

The present invention further provides a method of remotely attaching a first object to a second object comprising:

(a) providing the first object with a projectile surface of intermediate hardness;

(b) providing the second object with a target surface of layers of contrasting hardness wherein the outer layer of the target is softer than the projectile surface and the inner layer of the target surface is harder than the projectile surface; and (c) directing the projectile surface of intermediate hardness at the target surface such that the projectile surface penetrates the outer softer layer and expands upon impact with the harder inner layer thus securely locking the first object to the second object.

Thus, the apparatus for remotely attaching one object to another object, according to the present invention comprises:

(a) a target adapted to be attached to one of the objects and consisting of layers of contrasting hardness wherein the outer layer is a relatively soft material and the inner layer is a relatively hard material; and (b) a projectile adapted to be attached to the other object and consisting of a material of intermediate hardness relative to the soft and hard materials of the layers of the target. It is further provided that the projectile of intermediate hardness is further adapted to penetrate the softer outer layer of the target and expand upon impact with the harder inner layer, thus anchoring the projectile to the target. In one embodiment, the first object is tethered to the projectile and the projectile is of brass, the outer layer of the target is of lead, and the inner layer is of steel. In another embodiment of the invention, the projectile is slotted with a plurality of slits longitudinal to the direction of flight such that upon impact, the projectile will more readily expand.

It is a primary object of the present invention to provide an inexpensive yet reliable method of securely attaching one physical object to another physical object. It is a further object that this method be compatible with the physical objects being located in highly remote, hostile environments such as on the ocean floor or in outer space. Fulfillment of these objects and the presence and fulfillment of other objects will become apparent upon a complete reading of the specification taken in conjunction with the attached drawings.

DESCRIPTION OF THE PREFERRED EMBODIMENTS

Figure 1:
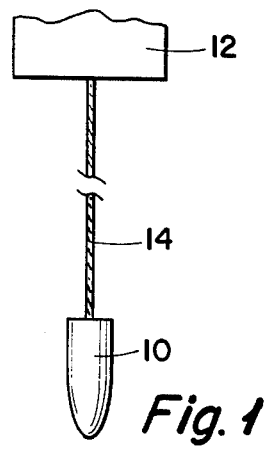
FIG. 1 illustrates a tethered projectile according to the present invention prior to being attached to a target.
Figure 2:
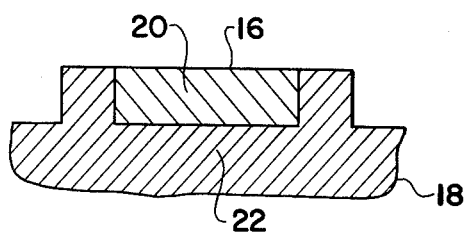
FIG. 2 illustrates a target according to the present invention prior to being attached to the projectile of FIG. 1.

The method and apparatus for remotely attaching one object to another object according to the present invention can perhaps be best explained and understood by reference to the drawings. FIG. 1 illustrates a tethered projectile 10 prior to impact with a target. The tethered projectile 10 is attached to one of the objects 12 via flexible cable 14. FIG. 2 illustrates a cross-sectional view of target 16 attached to the second object 18. As illustrated, target 16 is made up of two layers. The outer layer 20 is made of a material softer than the projectile 10, while the inner layer 22 is made of a harder material than projectile 10.

Figure 3:
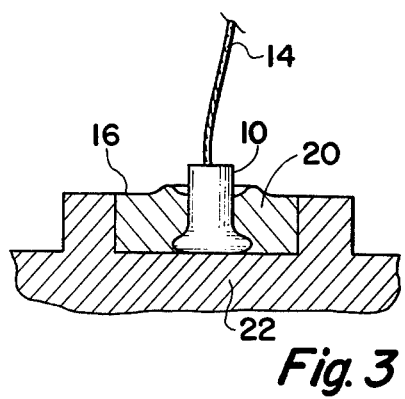
FIG. 3 illustrates the projectile of FIG. 1 after penetration and attachment to the target of FIG. 1.

In order to attach the first object 12 to the second object 18, the tethered projectile 10 is fired at the target 16. As illustrated in FIG. 3, the projectile 10 of intermediate hardness penetrates the softer outer layer 20 and upon impact with the harder base material 22 expands in a mushroom manner. The surrounding softer outer layer material then securely locks the projectile 10 to target 16 and hence, the objects remain attached.

Figure 4:
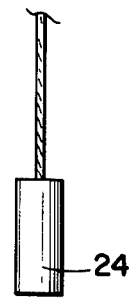
FIG. 4 illustrates an alternate embodiment of a tethered projectile prior to attachment.
Figure 5:
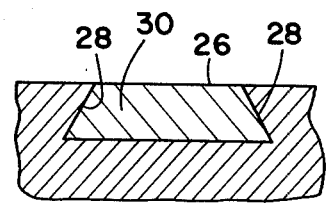
FIG. 5 illustrates an alternate embodiment of a target prior to attachment.
Figure 6:
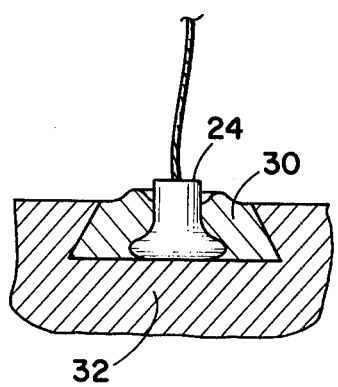
FIG. 6 illustrates the projectile of FIG. 4 after penetration and attachment to the target of FIG. 5.

In FIG. 4 an alternate embodiment of a tethered projectile 24 having an essentially rectangular profile and a preferred flat tip is illustrated. FIG. 5 illustrates an alternate target 26 wherein the sidewalls 28 that confine the softer layer 30 are preferably undercut such as to enhance the mechanical attachment after impact. FIG. 6 again illustrates the attached expanded projectile 24 being securely held by the softer layer 30 after penetration of this layer and impact with the harder underlayer 32.

Figure 7:
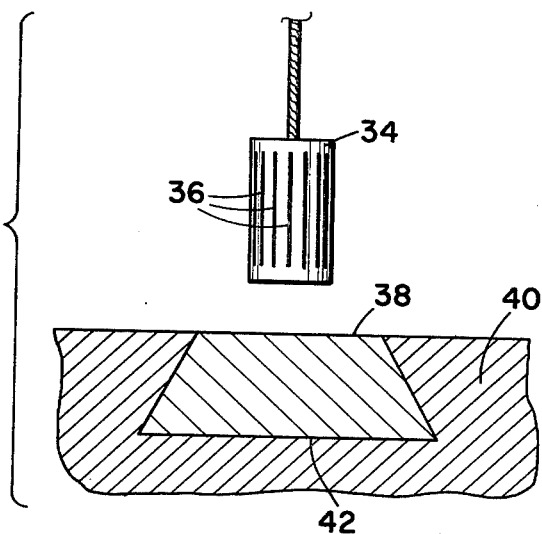
FIG. 7 illustrates a slotted tubular projectile approaching a target.
Figure 8:
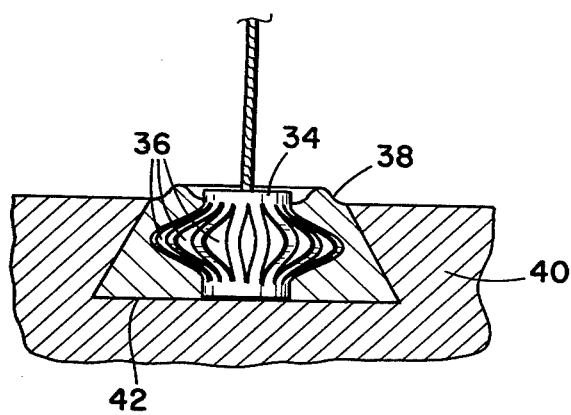
FIG. 8 illustrates the projectile of FIG. 7 after penetration and attachment to the target.

FIGS. 7 and 8 illustrate another alternate embodiment of the invention wherein a projectile 34 is characterized by having a plurality of slits 36 longitudinal to the direction of flight. The slits 36 can either extend through the entire projectile 34 or preferably the projectile can be a hollow tubular structure with slits 36 passing through the sidewalls of the projectile. After penetration of the softer outer layer 38 of the target 40 and upon impact with the harder underlayer 42, the slits 36 will allow the sidewalls of the projectile to readily expand and interlock with the target 40.

Figure 9:
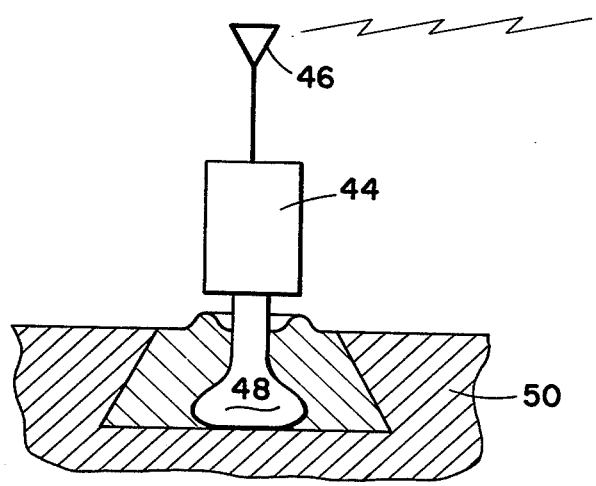
FIG. 9 illustrates a nontethered embodiment involving an instrument and transmitter attached to the projectile.

FIG. 9 illustrates a further embodiment wherein an instrument package 44 including a transmitter and antenna 46 are an integral unit with the projectile 48 which, as illustrated, has already been remotely attached to target surface 50. Such an embodiment is viewed as being extremely useful in hostile environments for secientific data acquisition, tracking, environmental monitoring, and the like.

The physical dimensions of the projectile, target, and thickness of the respective layers can be selected according to the particular requirements associated with attaching of the respective objects and the environment in which the remote attachment is to take place. Thus, a relatively large and thick projectile/target combination can be employed with larger objects and/or more severe environments.

The selection of material for making the projectile and the target, in principle, can involve any three compositions of contrasting hardness, wherein the projectile or its equivalent is of intermediate hardness sufficient to penetrate the softer outer layer but expands upon impact with the underlying base composition. Preferably, the three materials are metals of contrasting hardness such as a brass projectile, a lead outer target surface and a steel inner surface. However, other compositions are envisioned as operable including, but not limited to, various synthetic plastics or resins, other metals and alloys, naturally occuring materials, and combinations thereof.

The means for physically securing the respective objects to the projectile and/or target prior to the remote attachment procedure of the present invention can be any method or means well known in the art. Thus, the projectile and first object do not have to be tethered, but in fact can be one integral unit or the like.

The propelling or thrusting of the projectile into the target can also be any method well known in the art. Similarly, the role of the layered target and projectile can be interchanged in that the target can be propelled or fired at the projectile of intermediate hardness rather than the above illustrated reverse situation. Further, multiple targets and projectiles can be easily employed.

The method and apparatus of the present invention, although generally useful in a situation involving remote attachment of two objects, is viewed as being particularly useful in extremely hostile environments such as outer space or deep sea applications. Thus, it is useful to attach objects such as wire, cable, or instrument package to a space craft, buoy, ship or submarine and particularly useful in ocean bottom oil and gas production, ocean floor mining and the like.

Having thus described the preferred embodiment with a certain degree of particularity, it should be understood that many changes may be made in the details of the construction and the arrangement of the components without departing from the spirit and scope of this disclosure. As such the invention is not intended to be limited to the specific embodiments set forth herein for purposes of exemplification but is to be limited only be the scope of the attached claims including the full range of equivalents to which each element thereof is entitled.

I claim:

1. In a method for attaching one object to another object, the specific improvement comprising: propelling a projectile from a remote location into a target wherein said projectile is tethered to one of said objects and said target is attached to the other object and wherein said projectile is of a preselected intermediate hardness and said target is comprised of layers of preselected contrasting hardness consisting of an outer layer softer than said projectile and an inner layer harder than said projectile and wherein said inner harder layer underlies and forms a sidewall surrounding said outer softer layer such that said projectile penetrates said outer softer layer of said target and expands upon impact with the harder inner layer of said target while said softer layer is confined to said target by said sidewall, thus locking said projectile to said target.

2. A method of claim 1 wherein said projectile is brass, said outer softer layer is lead, and said inner harder layer is steel.

3. A method of claim 1 wherein said projectile contains a plurality of longitudinal slits.

4. A method of claim 4 wherein said projectile containing said plurality of longitudinal slits is tubular.

5. A method of remotely attaching a first object to a second object comprising:
    (a) providing said first object with a projectile of intermediate hardness wherein said projectile is tethered to said first object;
    (b) providing said second object with a target surface wherein said target surface is comprised of layers of preselected contrasting hardness consisting of an outer layer softer than said projectile and an inner layer harder than said projectile wherein said inner harder layer underlies and forms a sidewall surrounding said outer softer layer; and
    (c) directing said projectile of intermediate hardness at said target surface such that said projectile penetrates said outer softer layer and expands upon impact with said harder inner layer while said softer layer is confined to said target by said surrounding harder layer thus securely locking said projectile to said target.

6. A method of claim 5 wherein said projectile is brass, said outer layer is lead and said inner layer is steel.

7. A method of claim 5 wherein said projectile contains a plurality of longitudinal slits.

8. A method of claim 7 wherein said projectile containing said plurality of longitudinal slits is tubular.

9. An apparatus for remotely attaching one object to another object comprising:
(a) a target adapted to be attached to one of said objects and consisting of layers of contrasting hardness wherein the outer layer is a reltively soft material and the inner layer surrounding and underlying said softer outer layer is a relatively hard material; and
(b) a projectile adapted to be attached to the other of said objects and wherein said projectile consists of a material of intermediate hardness relative to said soft and hard materials of said layers of said target and wherein said projectile of intermediate hardness is further adapted to penetrate said softer outer layer of said target and expand upon impact with said harder inner layer while said softer outer layer is confined to said target by said surrounding and underlying inner harder layer thus locking said projectile to said target.

10. An apparatus of claim 9 wherein said projectile is brass, said outer layer is lead, and said inner layer is steel.

11. An apparatus of claim 9 wherein said projectile contains a plurality of longitudinal slits.

12. An apparatus of claim 11 wherein said projectile containing said plurality of longitudinal slits is tubular.

13. A method of remotely attaching a first object to a second object comprising:

(a) providing said first object with a tubular slotted projectile having a plurality of slits longitudinal to the direction of flight;
(b) providing said second object with a target surface of layers of contrasting hardness wherein the outer layer of said target is softer than the inner layer of said target surface wherein said harder inner layer underlies and forms a sidewall surrounding said softer outer layer; and
(c) directing said tubular slotted projectile at said target surface such that said projectile penetrates said outer softer layer and expands upon impact with said harder inner layer while said softer layer is confined to said target thus secuely locking said projectile to said target.

14. An apparatus for remotely attaching one object to another object comprising:
(a) a target adapted to be attached to one of said objects and consisting of layers of contrasting hardness wherein the outer layer is relatively soft material and the inner layer is a relatively hard material, wherein said harder inner layer underlies and forms a sidewall surrounding said softer outer layer; and
(b) a tubular slotted projectile adapted to be attached to the other of said objects and having a plurality of slits longitudinal to the direction of flight such that upon penetration of said outer layer and impact upon said inner layer the projectile will readily expand.

* * * * *